US 6,480,375 B2

(12) United States Patent
Horikoshi et al.

(10) Patent No.: US 6,480,375 B2
(45) Date of Patent: Nov. 12, 2002

(54) PROTECTION STRUCTURE FOR A DISK DRIVE AND ELECTRONIC APPARATUS

(75) Inventors: Seita Horikoshi, Zama; Takayuki Morino, Yamato; Hiroyuki Noguchi, Fujisawa, all of (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/835,055

(22) Filed: Apr. 13, 2001

(65) Prior Publication Data

US 2002/0015285 A1 Feb. 7, 2002

(30) Foreign Application Priority Data

Apr. 13, 2000 (JP) .................................... 2000-112688

(51) Int. Cl.[7] .................................................. H05K 7/00
(52) U.S. Cl. ................ 361/685; 360/97.01; 312/223.1; 369/137
(58) Field of Search .............................. 361/685–687; 360/246.6, 256.2, 48, 97.01; 312/223.1–223.6; 369/137, 291, 53

(56) References Cited

U.S. PATENT DOCUMENTS

| 5,936,935 A | * | 8/1999 | Hanakawa et al. ......... 369/291 |
| 5,956,213 A | * | 9/1999 | Dague et al. ............... 360/105 |
| 6,002,658 A | * | 12/1999 | Aso et al. ................... 369/137 |
| 6,009,057 A | * | 12/1999 | Furukawa et al. ........... 369/53 |

* cited by examiner

Primary Examiner—Darren Schuberg
Assistant Examiner—Hung Van Duong
(74) Attorney, Agent, or Firm—Douglas R. Millett

(57) ABSTRACT

To provide a protection structure for a disk drive and an electronic apparatus. The protection structure being designed not to damage a disk set in the disk drive even when a space provided to protect the disk drive is reduced.

12 Claims, 9 Drawing Sheets

PROTECTION STRUCTURE FOR A DISK DRIVE AND ELECTRONIC APPARATUS

BACKGROUND OF THE INVENTION

1. Field of the invention

The present invention relates to a protection structure for a disk drive housed in an electronic apparatus, as well as an electronic apparatus having such a protection structure.

2. Description of the Related Art

In a computer apparatus are often housed such disk drives as a hard disk drive (HDD), a floppy disk drive (FDD), a CD-ROM drive, a digital video disk drive (DVD drive), etc. And, this computer apparatus is generally provided with a protection structure for a hard disk in each of those disk drives. Hereunder, a description will be made for a conventional technique of such a computer apparatus, which is a lap-top personal computer (hereafter, to be referred to a lap-top PC) with respect to a hard disk drive, which is one of the above described disk drives.

As shown in FIG. 8, a hard disk drive 84 is housed in a palm rest (housing) 82 of the conventional lap-top PC 80. And, as shown in FIG. 9, the housing portion of the hard disk drive 84 is decided by a housing member 86. The housing member 86 has a guide member 90 for guiding the hard disk drive 84 to the housing position.

And, a horseshoe-like supporting member 92 is provided between the hard disk drive 84 and the palm rest 82. This supporting member 92 supports the palm rest 82 from inside.

As shown in FIG. 10, this supporting member 92 is in contact with both of the periphery of the case 85 of the hard disk drive 84 and the inner surface of the palm rest 82. A predetermined space D (usually, 2.5 mm or so) is formed between a case 85 of the hard disk drive 84 and the inner surface of the palm rest 82. Consequently, the palm rest 82 is prevented from coming into contact with the hard disk drive 84 even when the palm rest 82 is recessed inside due to a shock, etc. Consequently, a hard disk 94 can be prevented from damages.

In some cases, the palm rest 82 is made of such a material as magnesium or the like having high stiffness properties so as to eliminate the supporting member 92 and reduce the number of parts to be employed for the lap-top PC apparatus. In this case, however, the high price of the magnesium is an obstacle. And, even when such the countermeasure is taken, forming of the predetermined space D is still indispensable.

The lap-top PCs are now getting smaller and thinner in size. Consequently, it is strongly demanded to reduce the space D between the hard disk drive 84 and the palm rest 82 respectively.

If the space D is reduced more, however, the palm rest 82 might come in contact with the hard disk drive 84, causing the hard disk 94 to be damaged when the palm rest 82 is recessed inside due to a shock, etc.

Under such circumstances, it is an object of the present invention to provide a protection structure for a disk drive, which can prevent a disk from damage even when a space for protecting the disk drive is reduced. It is another object of the present invention to provide such an electronic apparatus as a personal computer provided with such a protection structure, thereby the lap-top PC can be designed smaller and thinner in size.

SUMMARY OF THE INVENTION

The protection structure for a disk drive according to the present invention protects a disk drive housed in the housing of the subject electronic apparatus, leaving a space from the inner surface of the housing. And, the protection structure is characterized by a reinforcement member provided for reinforcing the housing between the inner surface of the housing and the disk drive.

The above described disk drive may be a hard disk drive, a floppy disk drive, a CD-ROM drive, a digital video disk drive, or the like.

Because the housing of the electronic apparatus is reinforced from inside by the reinforcement member, the housing is suppressed from deformation even when such a load as an impact force is applied to the housing from outside. Consequently, the space between the housing and the disk drive can be reduced within a range that can protect the disk inside the disk drive from damages.

The reinforcement member is often made of such a material as metal, etc. having high stiffness properties than those of the housing.

As a preferred embodiment, the reinforcement member has a recess portion to the disk drive and a load applied to the housing from outside is supported at the periphery of the recess portion.

Consequently, the above described space can be easily reduced by using a simple-structured reinforcement member.

The recess portion is, for example, a dome portion formed in a dome shape. This is why the reinforcement member can be simplified in shape significantly. This dome portion is usually provided in an area corresponding to the disk in the disk drive.

In this case, a curve portion may be formed at the inner surface side of the housing so as to be matched with the shape of the dome portion. Consequently, the space between the disk drive and the outer surface of the housing can further be reduced. And, this is very effective to design such an electronic apparatus as a lap-top PC, etc. thinner in shape.

A plurality of ribs may be formed at least at the periphery of the dome portion so as to be extended radially from the center of the dome portion to the periphery. Consequently, the durability load of the dome portion can be improved more. In addition, the shape of the dome portion is protected even from an excessive force applied thereon, thereby the disk is prevented from serious damage.

The outer periphery of the reinforcement member may come in contact with the guide member provided along the side surface of the disk drive. Consequently, the reinforcement member can be supported by the guide member.

Furthermore, the outer periphery of the reinforcement member may come in contact with the guide member via a shock absorber. In this case, the shock absorber can ease an impact force applied to the reinforcement member.

This shock absorber may be a space, for example, formed by folding an end of a metallic plate. In this case, if the outer periphery of the reinforcement member is made of a metallic plate, such a shock absorber can be formed very easily.

If the guide member has an engaging recess portion and the reinforcement member has an engaging projection portion formed at its outer periphery, the reinforcement member can be attached in one step, and the guide member can stand a force applied to the reinforcement member.

Furthermore, if the guide member has an engaging recess portion, a through-hole is formed at the outer periphery of the reinforcement member so as to correspond to the engaging recess portion, and an engaging projection portion is formed inside the housing so as to be engaged with the recess portion via the through-hole, then the reinforcement member can be attach only by pushing it to both of the housing and the guide member.

The personal computer of the present invention has such a protection structure for a disk drive according to the present invention.

Consequently, it is possible to reduce the space formed between the housing of the personal computer and the disk drive, so the personal computer can be designed smaller and thinner in shape.

Furthermore, the electronic apparatus of the present invention is also provided with such a protection structure for a disk drive according to the present invention.

Consequently, the electronic apparatus can be designed smaller and thinner in shape just like the personal computer of the present invention.

DESCRIPTION OF THE PREFERRED EMBODIMENT

Hereunder, the preferred embodiments of the present invention will be described with reference to the accompanying drawings.

Figure 1:
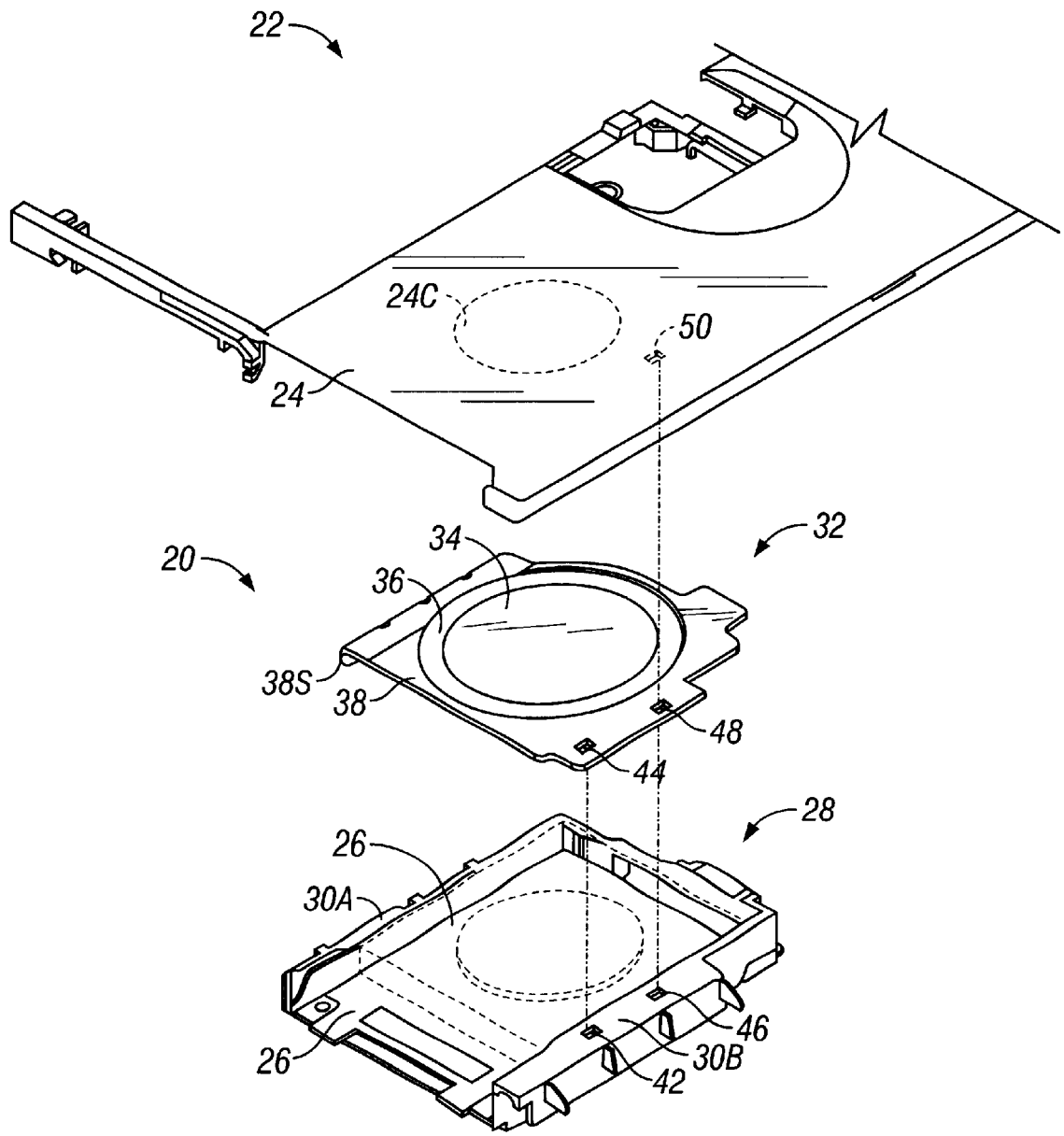
FIG. 1 is an exploded perspective view of a protection structure of a lap-top personal computer in a first embodiment of the present invention.

As shown in FIG. 1, a protection structure 20 in this embodiment is provided for a lap-top personal computer (hereafter, to be referred to as a lap-top PC) 22.

Inside a palm rest (housing) 24 of the lap-top PC 22 is housed a hard disk drive 26. The housing position of the hard disk drive 26 is decided by a housing member 28. The housing member 28 has rail-like guide members 30A and 30B for guiding the hard disk drive 26 to the housing position.

Figure 2:
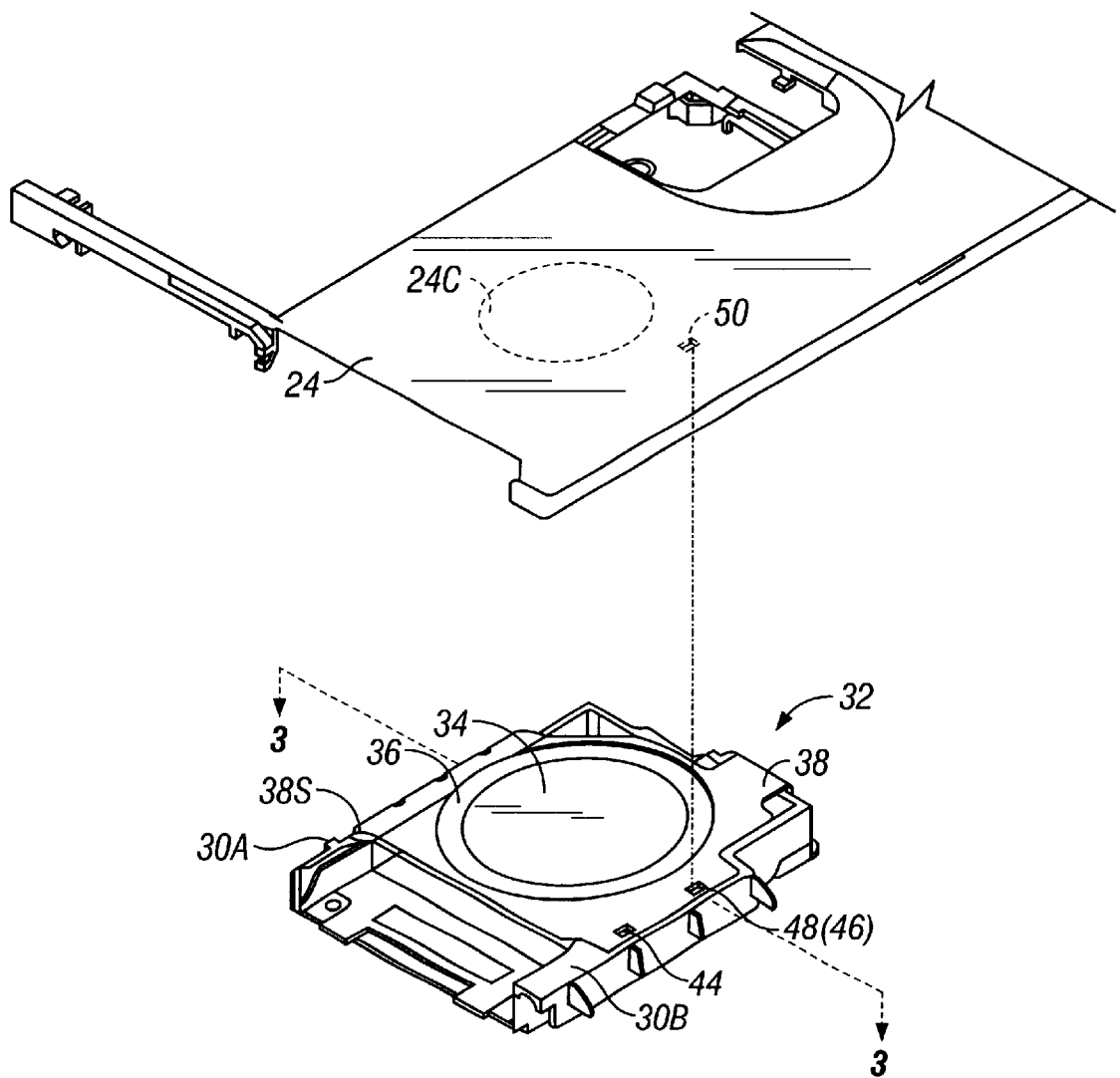
FIG. 2 is a perspective view of a reinforcement member coming in contact with a guide member.
Figure 3:
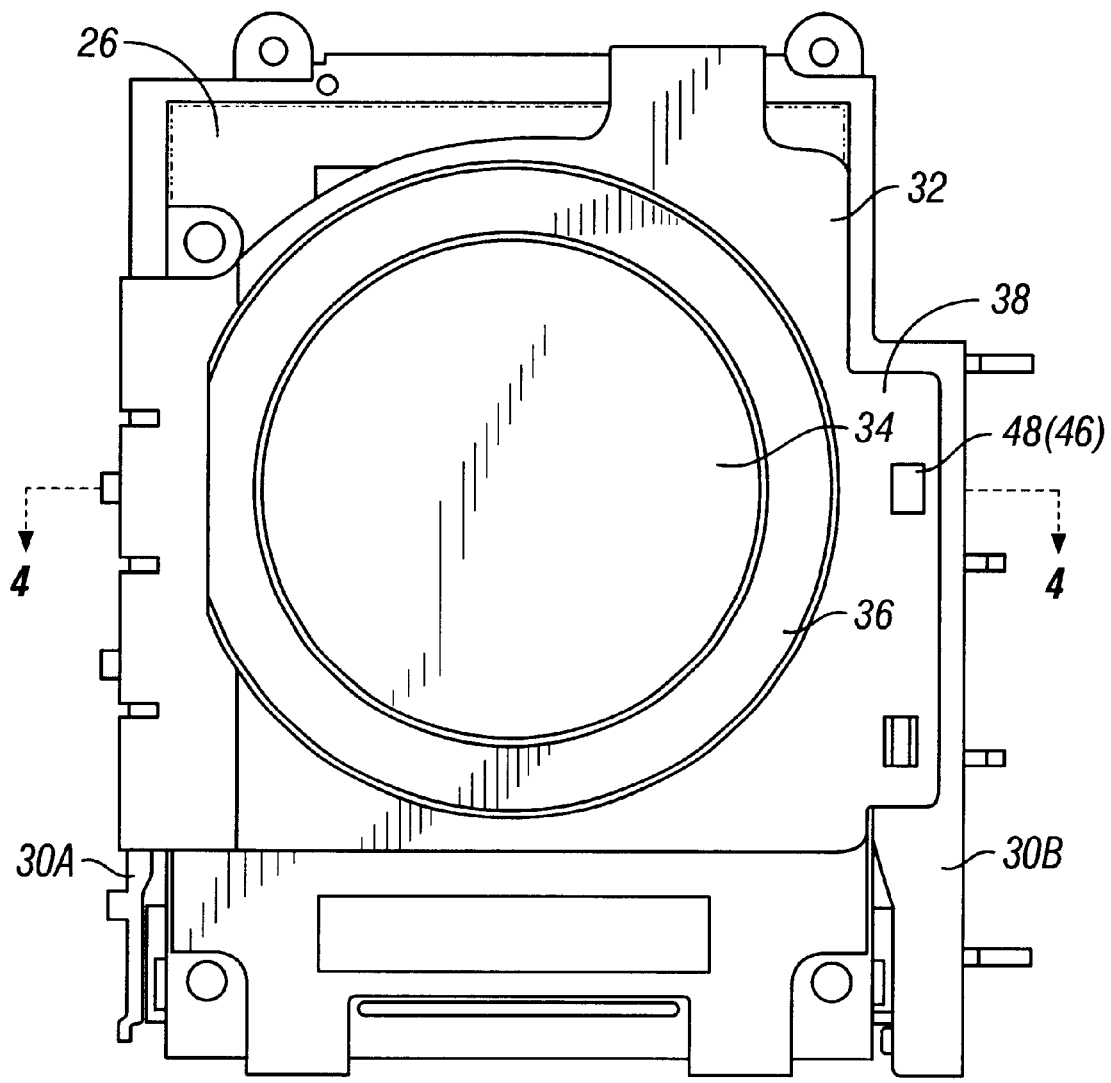
FIG. 3 is a plan view of the reinforcement member in contact with the guide member shown in FIG. 2.

Furthermore, as shown in FIGS. 1 through 3, a reinforcement member 32 is provided between the hard disk drive 26 and the palm rest 24. The reinforcement member 32 comprises a dome portion 34 for covering an area corresponding to a hard disk 27 (see FIG. 4) in the hard disk drive 26; a flat plate-like ring portion 36 continued to a periphery of the dome portion 34; and an external periphery 38 continued to the outer periphery of the ring portion 36.

Figure 4:
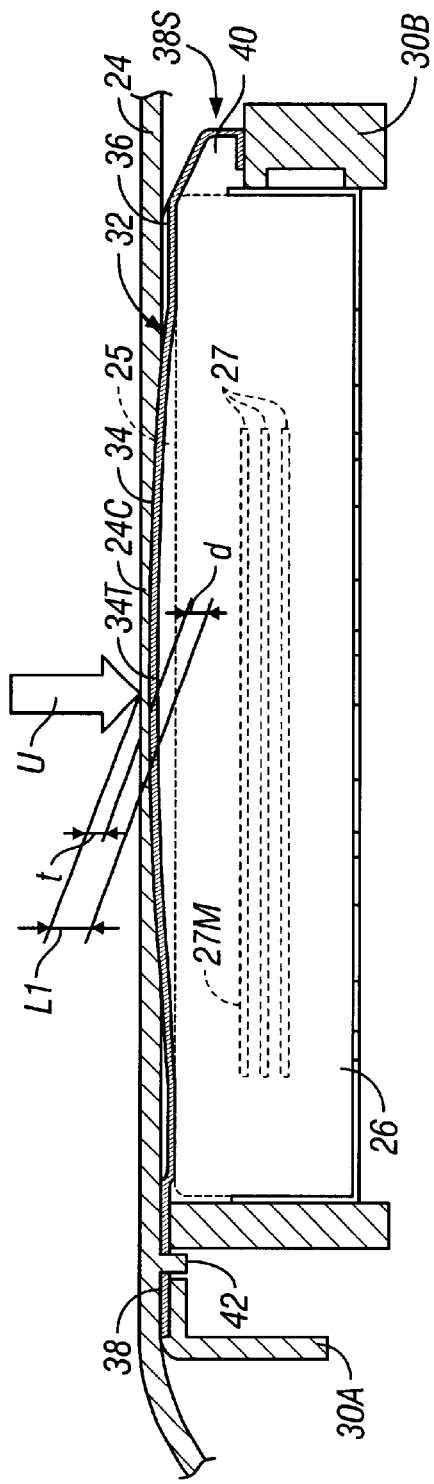
FIG. 4 is a side cross sectional view taken along line 4—4 of FIG. 3.

As shown in FIG. 4, the dome portion 34 is protruded to the palm rest 24 and the extreme top portion 34T of the dome portion 34 comes just above the center portion 27M of the hard disk 27.

The palm rest 24 has a curve portion 24C, which is formed by curving the inner surface of the palm rest 24 so as to be matched with the shape of the dome portion 34. This curve portion 24C is designed thin, so that the subject lap-top PC 22 can be designed thinner in shape.

At one end of the outer periphery 38 is formed a shock absorber 38S. This shock absorber 38S comes in contact with the top end of the guide member 30A. This shock absorber 38S has a space 40 formed by folding an end of a metallic plate.

In this case, the shock absorber 38S can ease an impact force applied to the dome portion 34. This impact force is also eased by the guide member 30B in which a through-hole 42 (to be described later) is formed. The reinforcement member 32 is made of a processed metallic plate (SUS304 ½·H). Consequently, an end of the metallic plate is folded so as to form this shock absorber 38S easily and simply.

An engaging through-hole 42 (see FIG. 1) is also formed at the top end of the other guide member 30B. And, a projection portion 44 is formed at the outer periphery 38 so as to be corresponded to this through-hole 42. Consequently, the reinforcement member 32 can be attached to the housing member 28 just pushing it when the lap-top PC 22 is manufactured. In addition, it is effective to support a force applied to the dome portion 34 at the guide member 30B.

Furthermore, another through-hole 46 is formed slightly away from the through-hole 42 at the top end of this guide member 30B. And, a through-hole 38 is formed so as to correspond to this through-hole 46 at the outer periphery 38. And, a projection portion 50 is formed under the palm rest 24 so as to be engaged with the hall surface of the through-hole 46 by passing through the through-hole 48. Consequently, the guide member 30B and the palm rest 24 work together to fix the reinforcement member 32 to the housing member 28 easily and reliably.

As shown in FIG. 4, the ring portion 36 of the reinforcement member 32 is slightly in contact with the case 25 of the hard disk drive 26. Consequently, if the dome portion 34 is pressed from above by a force U applied to the palm rest 24 from outside, the reinforcement member 32 is supported lightly by the case 25 of the hard disk drive 26 at the ring portion 36, as well as it is supported enough by both the guide members 30A and 30B.

If an external pressure is applied to the case 25 at this time, the case 25 is apt to be deformed most easily in its center, but it is not deformed so easily at the periphery of the case 25 that supports the ring portion 36 lightly. Consequently, the case 25 supported lightly as described above is hardly deformed with the pressure from the ring portion 36 of the reinforcement member 32. The hard disk 27 in the case 25 is thus protected surely from damage.

In this embodiment, the maximum value d of the space to be formed between the case 25 of the hard disk drive 26 and the reinforcement member 32 can be reduced more significantly from the conventional one due to the configuration, operation, etc. described above, so that the hard disk 27 can be protected from damage even when the palm rest 24 receives an external impact force, etc.

Figure 10:
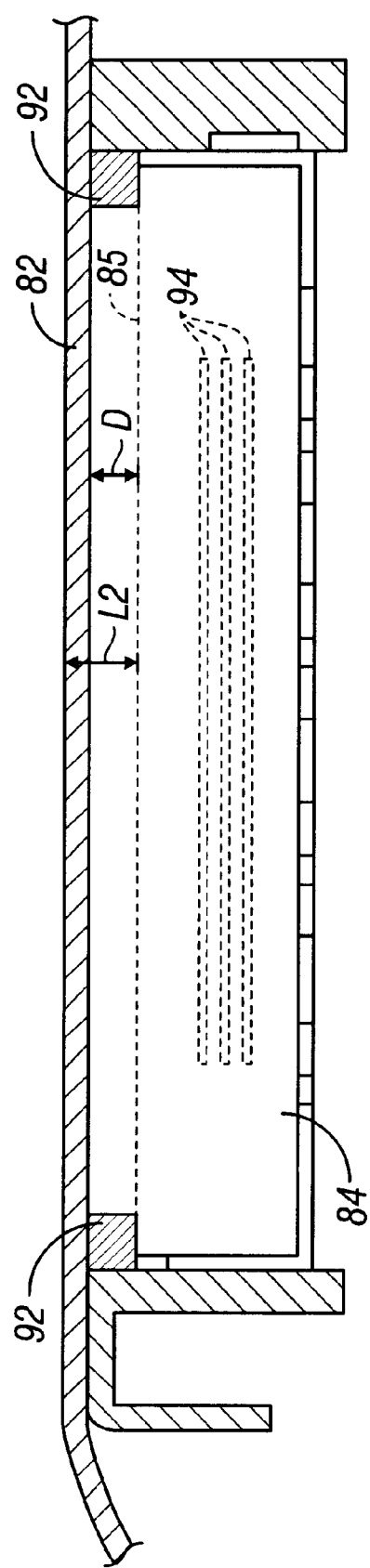
FIG. 10 is a side cross sectional view of the configuration shown in FIG. 8.

Hereunder, a description will be made for the effect of the above space with reference to its concrete values. As shown in FIG. 4, the maximum value d of the space is 1.25 mm, which appears in the center of the dome portion 34. The thickness t of 5 the curve portion 24C in the center of the dome portion 34 is 0.8 mm and the thickness of the dome portion itself is 0.4 mm. Consequently, the distance L1 between the case 25 and the outside of the palm rest 24 is 2.45 mm. On the other hand, in the case of the conventional lap-top PC 80, as shown in FIG. 10, the space D between the case 85 and the inner surface of the palm rest 82 is 2.5 mm and the thickness of the palm rest 82 is 1.5 mm (the average thickness is 1.5 mm). Thus, the distance L2 between the case 85 and the outside of the palm rest 82 is 4.00 mm.

Consequently, the present invention can provide a lap-top PC 22 that can be designed much thinner in shape than the conventional one.

A withstand load test was conducted to check the withstand load of the lap-top PC 22 provided with the protection structure 20 by applying a pressure U (see FIG. 4) to the palm rest 24 from outside the curve portion 24C. As a result of the test, it was found that the withstand load was 18 kgf.

On the other hand, if the space D between the case 85 of the hard disk drive 84 and the inner surface of the palm rest 82 is assumed to be 1.25 mm in the conventional lap-top PC 80 (FIG. 10), then the withstand load is about 9 kgf. Consequently, it is found that the withstand load could be improved to double in the PC provided with the protection structure 20 of the present invention even when the space is the same between both PCs.

Figure 5:
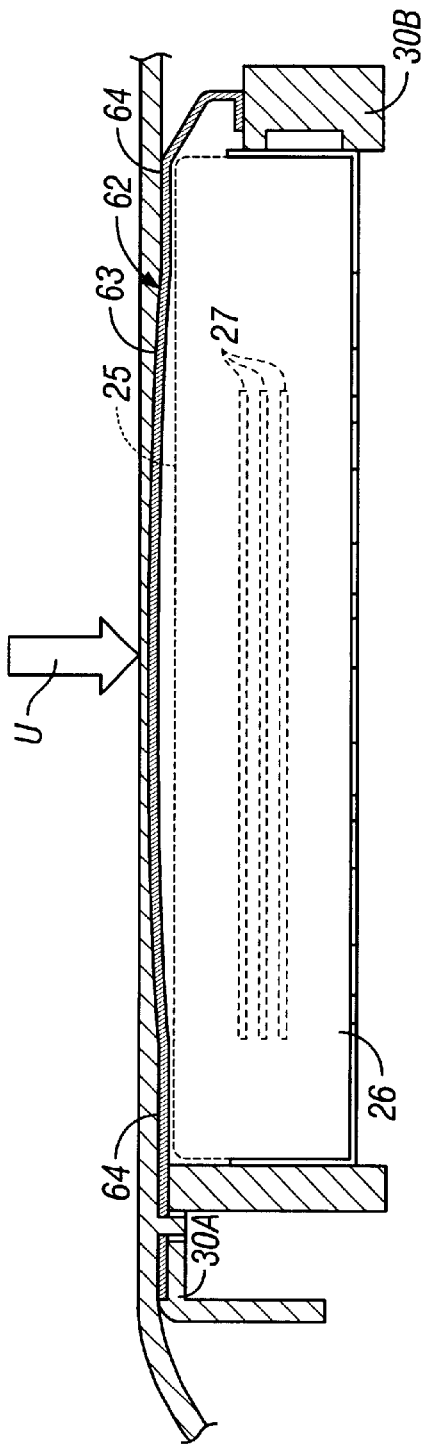
FIG. 5 is a side cross sectional view, similar to FIG. 4, of a variation of the protection structure in the first embodiment of the present invention.

As shown in FIG. 5, the reinforcement member 32 may be replaced with the reinforcement 62 in the lap-top PC 22 as shown in FIG. 5. The reinforcement member 62 is not in contact with the case 25. This reinforcement member 62 does not have the ring portion 36 as described in the first embodiment. The periphery of the dome portion 63 is continued to the outer periphery 64. If a pressure U is applied to the dome portion 63, therefore, the reinforcement member 62 is supported completely by the guide members 30A and 30B.

Consequently, the hard disk drive 26 does not receive any force.

Figure 6:
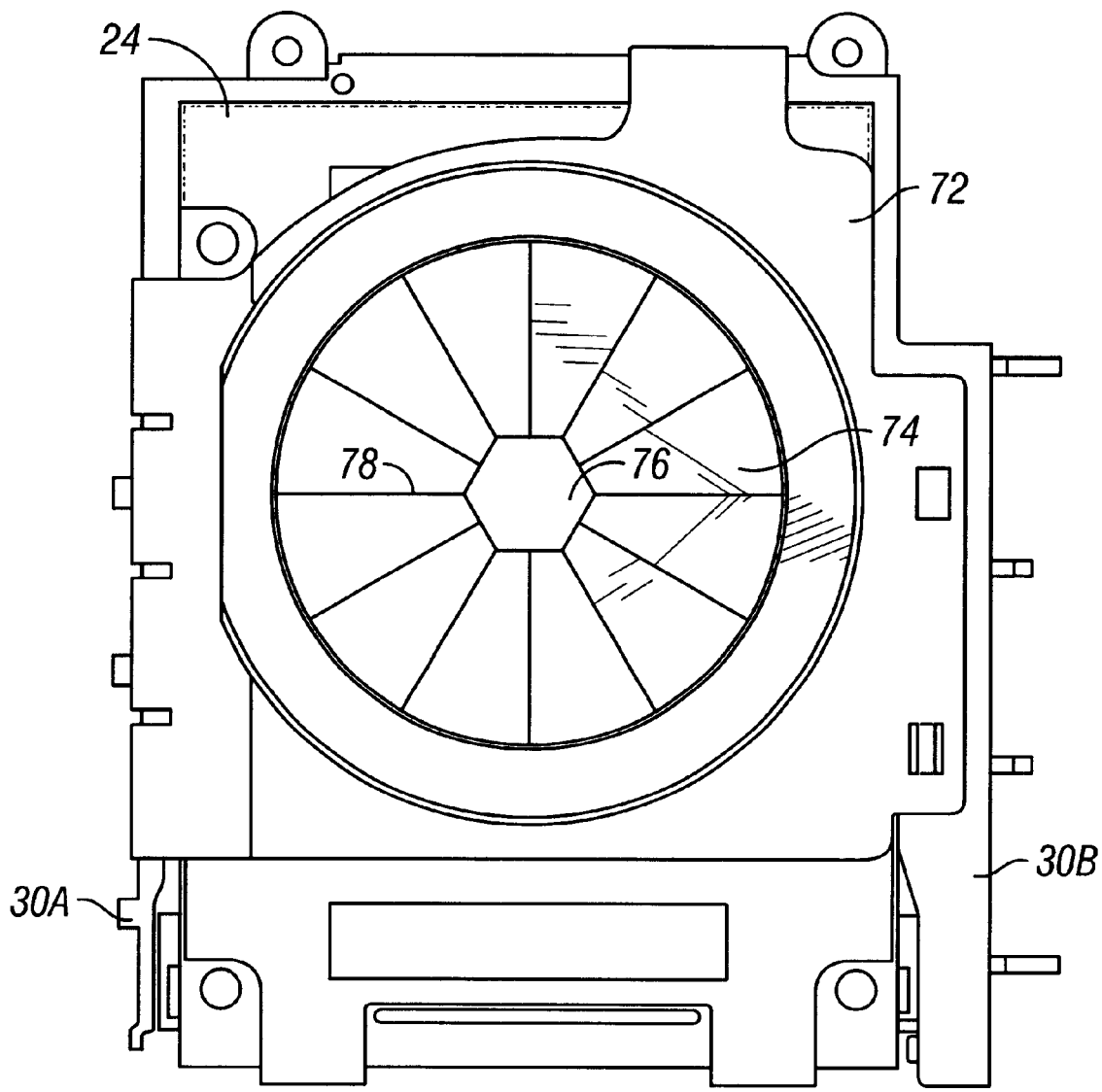
FIG. 6 is a top view of a shape of a reinforcement member for a protection structure of a lap-top personal computer in a second embodiment of the present invention.
Figure 7:
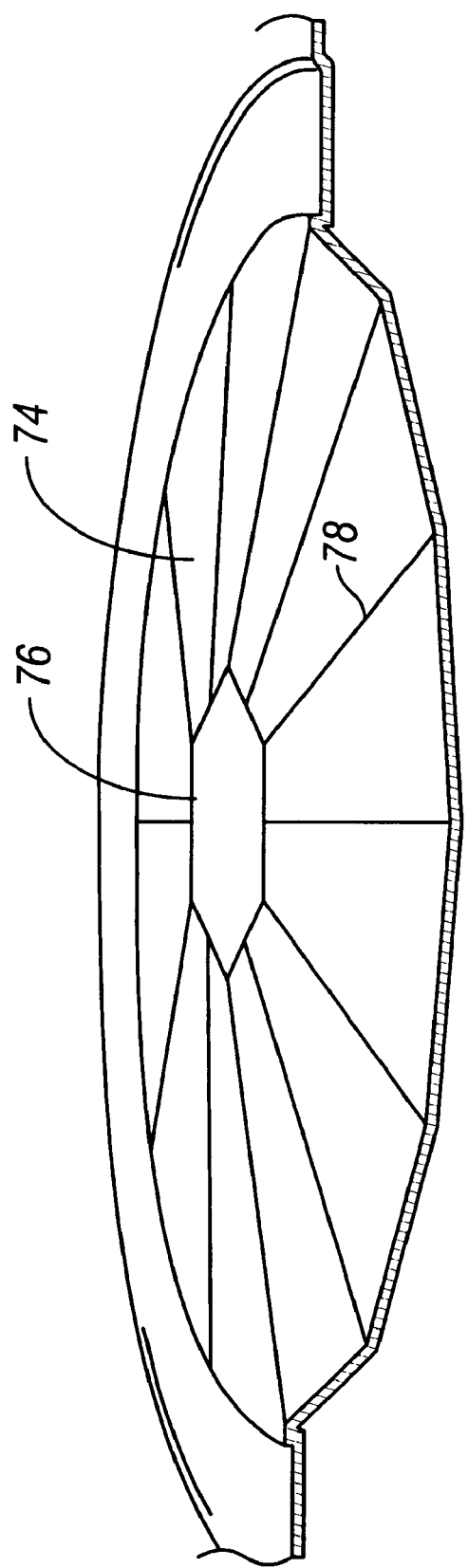
FIG. 7 is a perspective view of a shape of the reinforcement member of the protection structure of the lap-top personal computer in the second embodiment of the present invention.
Figure 8:
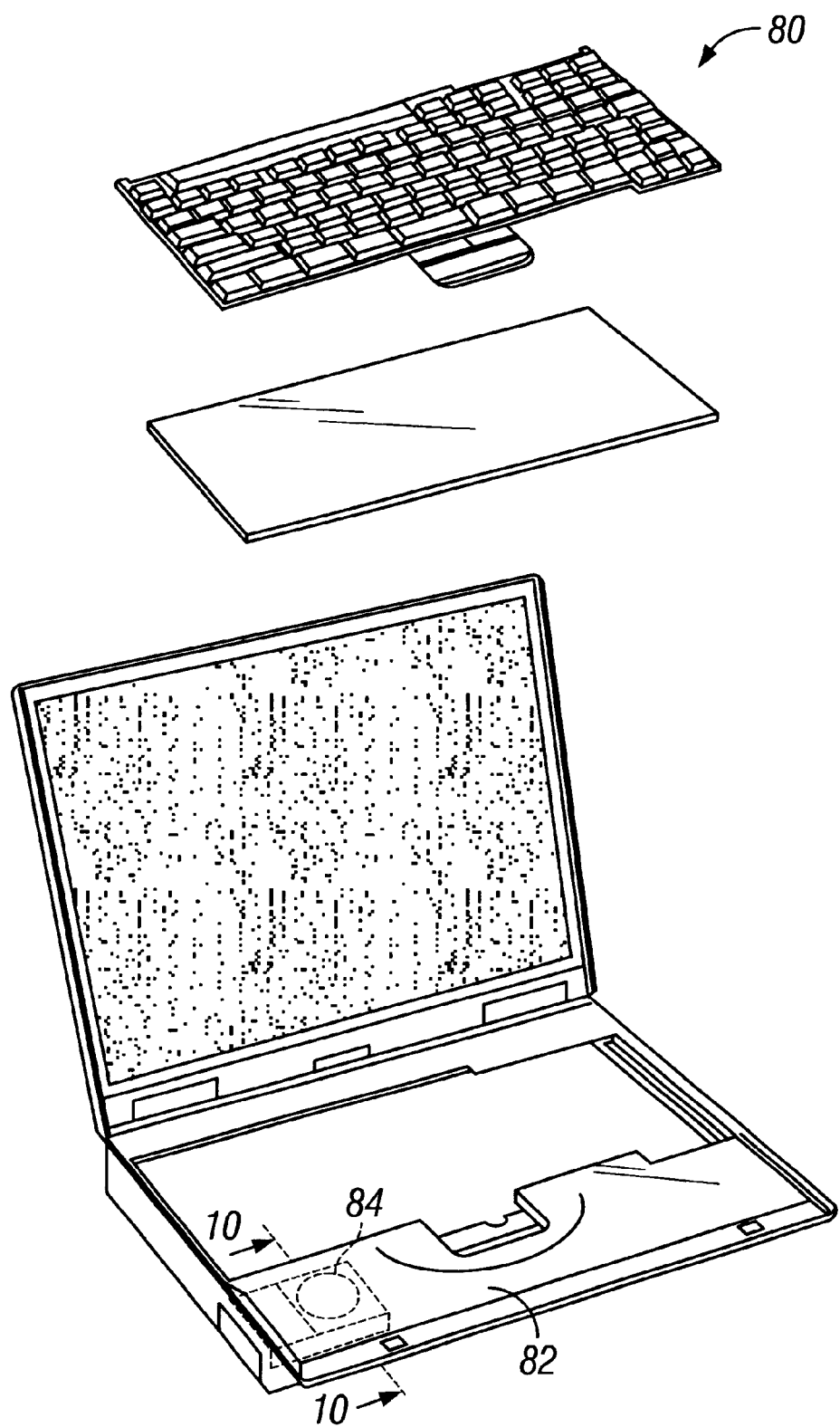
FIG. 8 is an exploded perspective view of a conventional lap-top personal computer.
Figure 9:
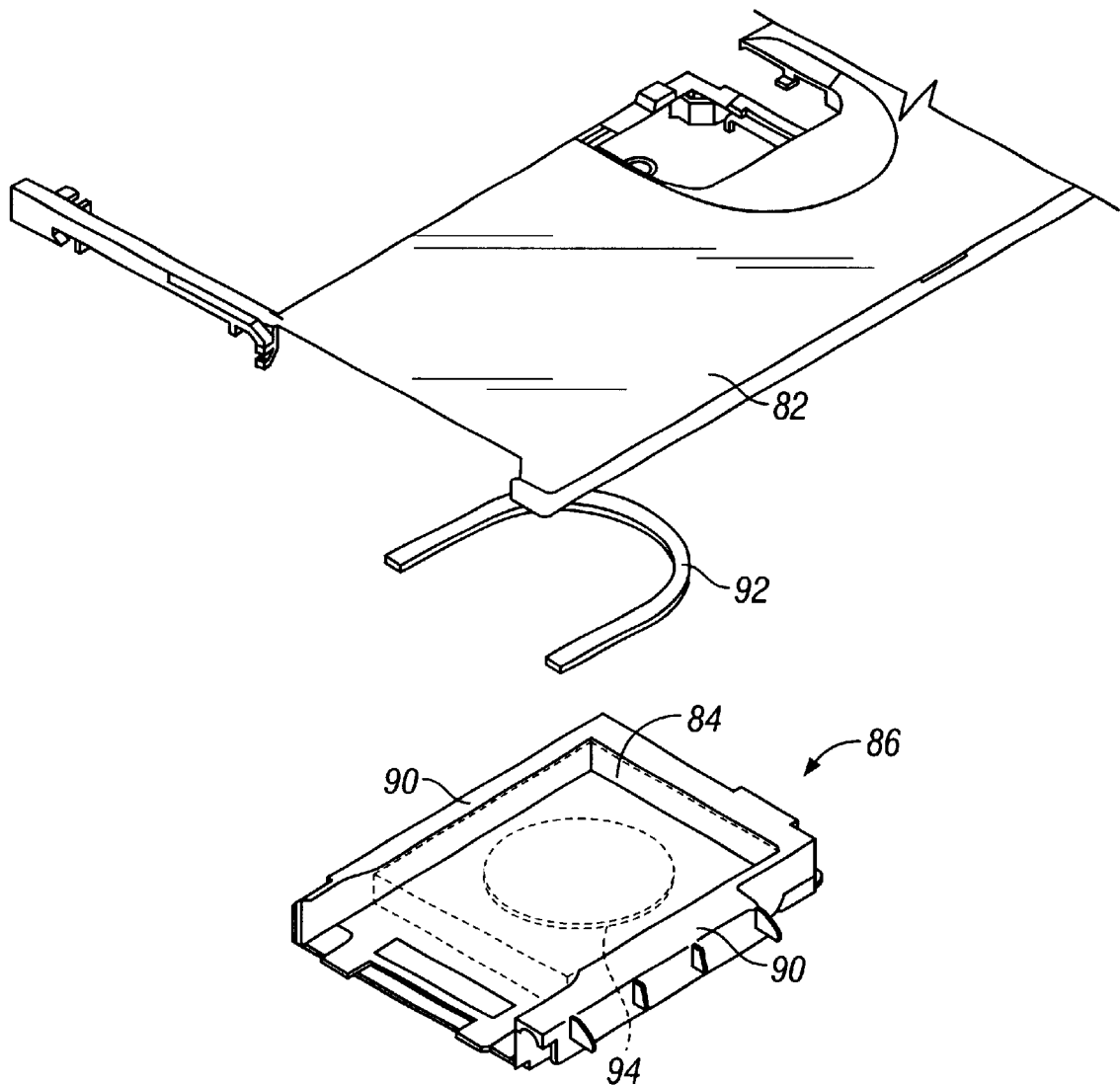
FIG. 9 is an exploded perspective view of a protection structure of the conventional lap-top personal computer.

Hereunder, the protection structure in the second embodiment of the present invention will be described with reference to the accompanying drawings. As shown in FIGS. 6 and 7, the protection structure in this embodiment uses a reinforcement member 72 instead of the reinforcement member 32 in the first embodiment. Although the dome shape differs between the reinforcement members 32 and 72, other configuration items are identical in both reinforcement members.

The dome 74 of the reinforcement member 72 has a flat top portion 76. And, ribs 78 are formed radially from around the flat portion 76 to the periphery of the dome portion 74.

The ribs 78 are molded with use of dies, then subjected to press working so as to form string-like projections, that is, linear projections of 0.1 mm or under in height on the surface (the surface in the bulging direction) of the dome portion 74.

Consequently, the durability of the dome portion 74 is improved more than that of the first embodiment. Consequently, the shape of the dome portion 74 can stand any excessive force to be applied to the dome portion 74, thereby the hard disk 27 is prevented from serious damage.

And, because the dome portion 74 has the flat top 76, the height of the dome portion 74 is lowered than that in the first embodiment. In addition, the shape of the palm rest (not illustrated) at the inner surface side is matched with the reinforcement member 72, especially with the flat portion 76 in this embodiment. Consequently, the lap-top PC can further be designed thinner in shape.

The above embodiments described with respect to a hard disk drive are just examples, and the scope of the interests of the present invention is not limited only to those embodiments, of course.

We claim:

1. An apparatus for protecting a disk drive, the disk drive being disposed within a housing of a personal computer, the apparatus comprising:

a reinforcing member, disposed between said disk drive and an inner surface of said housing, said reinforcing member is a metallic plate formed with a dome shaped portion having an apex and with a plate-like ring at a periphery of said dome shaped portion, said apex of said dome shaped portion contacts said inner surface of said housing, said plate-like ring contacting said disk drive; and wherein said reinforcing member is relatively stiffer than said housing.

2. The apparatus of claim 1, wherein said reinforcing member maintains a predetermined minimum spacing between said disk drive and said inner surface of said housing.

3. An apparatus for protecting a disk drive, the disk drive being disposed within a housing of a personal computer, the apparatus comprising:

a reinforcing member, disposed between said disk drive and an inner surface of said housing, said reinforcing member is a metallic plate having an outer edge and is formed with a shock absorber at said outer edge for somewhat elastic connection relative to said disk drive;

and wherein said reinforcing member is relatively stiffer than said housing.

4. The apparatus of claim 3, wherein said reinforcing member maintains a predetermined minimum spacing between said disk drive and said inner surface of said housing.

5. A computer having improved mechanical shock resistance allowing for a thinner exterior profile, comprising:

a housing having an inner surface;

a disk drive mounted within said housing, spaced at substantially a predetermined distance from said inner surface of said housing;

a reinforcement member between said disk drive and said housing, said reinforcement member being relatively stiffer than said housing, said reinforcing member is a metallic plate formed with a dome shaped portion having an apex, said apex contacting said inner surface of said housing.

6. The apparatus of claim 5, wherein said metallic plate is further formed with a plate-like ring portion formed at a periphery of said dome shaped portion, said plate-like ring portion contacting said disk drive.

7. The apparatus of claim 5, wherein said reinforcement member contacts said inner surface of said housing and said disk drive to keep said disk drive spaced at least said predetermined distance from said inner surface of said housing.

8. The apparatus of claim 5, further comprising a shock absorber, formed at an edge of said reinforcing member, providing a somewhat elastic connection of said reinforcing member relative to said disk drive.

9. The apparatus of claim 5, further comprising a housing member mounting said disk being held within said housing of said computer, said reinforcing member being connected, at least in part, with said housing member.

10. The apparatus of claim 5, further comprising a guide member that positions said disk drive within said housing and wherein an edge of said reinforcing member contacts said guide member.

11. The apparatus of claim 6, wherein said inner surface of said housing is formed with a concave portion for mating contact with said dome shaped portion of said reinforcing member.

12. A computer having improved mechanical shock resistance allowing for a thinner exterior profile, comprising:

a housing having an inner surface;

a disk drive mounted within said housing, spaced at substantially a predetermined distance from said inner surface of said housing;

a guide member that positions said disk drive within said housing; and a reinforcement member between said disk drive and said housing, said reinforcement member being relatively stiffer than said housing, wherein said reinforcing member is formed at it's edge with a fold, and wherein said reinforcing member is connected with said guide member at said fold, said fold providing shock absorbing relative movement between said reinforcing member and said guide member.

* * * * *